US012596801B2

(12) United States Patent
Suh et al.

(10) Patent No.: US 12,596,801 B2
(45) Date of Patent: Apr. 7, 2026

(54) METHOD AND APPARATUS FOR DETECTING COMMAND CONTROL SERVER OF MALICIOUS APPLICATION

(71) Applicant: S2W INC., Seongnam-si (KR)

(72) Inventors: Sang Duk Suh, Seongnam-si (KR); Jae Ki Kim, Changwon-si (KR)

(73) Assignee: S2W INC., Seongnam-si (KR)

( * ) Notice: Subject to any disclaimer, the term of this patent is extended or adjusted under 35 U.S.C. 154(b) by 159 days.

(21) Appl. No.: 18/543,555

(22) Filed: Dec. 18, 2023

(65) Prior Publication Data

US 2024/0330452 A1    Oct. 3, 2024

(30) Foreign Application Priority Data

Dec. 29, 2022    (KR) ......................... 10-2022-0189156

(51) Int. Cl.
*G06F 21/00*        (2013.01)
*G06F 21/56*        (2013.01)

(52) U.S. Cl.
CPC ............ *G06F 21/56* (2013.01); *G06F 21/561* (2013.01)

(58) Field of Classification Search
CPC ..... G06F 21/56; G06F 21/561; H04L 63/145; H04L 2463/146
See application file for complete search history.

(56) References Cited

U.S. PATENT DOCUMENTS

| | | | | |
|---|---|---|---|---|
| 7,007,302 | B1 * | 2/2006 | Jagger ..................... | G06F 21/56 |
| | | | | 726/25 |
| 9,680,864 | B2 * | 6/2017 | Khesin ................ | H04W 12/128 |

| | | | | |
|---|---|---|---|---|
| 2015/0135316 | A1 * | 5/2015 | Tock ..................... | G06F 21/566 |
| | | | | 726/23 |
| 2015/0135317 | A1 * | 5/2015 | Tock ..................... | G06F 21/56 |
| | | | | 726/23 |
| 2015/0150129 | A1 * | 5/2015 | Giura ................... | H04L 63/145 |
| | | | | 726/23 |
| 2016/0094338 | A1 * | 3/2016 | Pappachan ........... | G06F 21/445 |
| | | | | 713/189 |
| 2018/0077195 | A1 * | 3/2018 | Gathala ............... | H04L 63/1433 |
| 2018/0212998 | A1 * | 7/2018 | Ahuja ................. | G06F 9/45558 |
| 2020/0028769 | A1 * | 1/2020 | Kumar ................. | H04L 67/025 |
| 2020/0304529 | A1 * | 9/2020 | Fehrman ............. | H04L 63/0236 |

(Continued)

FOREIGN PATENT DOCUMENTS

| | | | | | |
|---|---|---|---|---|---|
| CN | 111597557 | A | * | 8/2020 | .......... G06F 21/566 |
| CN | 113792294 | A | * | 12/2021 | .......... G06F 21/563 |
| KR | 10-1038048 | B1 | | 6/2011 | |

OTHER PUBLICATIONS

Office communication dated Jul. 9, 2024 in Application No. 10-2022-0189156.

(Continued)

*Primary Examiner* — Don G Zhao
(74) *Attorney, Agent, or Firm* — USX IP LLC

(57)        ABSTRACT

Provided is an apparatus for detecting a command control server, the apparatus including: a collection unit configured to collect a malicious application; a malicious type determination unit configured to analyze the malicious application to determine a malicious type of the malicious application; and a command control server detection unit configured to detect a command control server associated with the malicious application based on the determined malicious type.

9 Claims, 4 Drawing Sheets

(56)                References Cited

U.S. PATENT DOCUMENTS

| | | | |
|---|---|---|---|
| 2022/0272043 A1* | 8/2022 | Mishra | G06N 20/00 |
| 2022/0342982 A1* | 10/2022 | Huseynov | G06F 21/552 |
| 2022/0417272 A1* | 12/2022 | Grover | H04L 9/3247 |
| 2023/0188513 A1* | 6/2023 | Ren | H04L 63/0236 |
| | | | 713/160 |
| 2023/0214487 A1* | 7/2023 | Galhardo Moia | G06F 21/566 |
| | | | 726/22 |
| 2023/0297670 A1* | 9/2023 | Qi | G06F 21/552 |
| 2024/0256678 A1* | 8/2024 | Thompson | G06F 21/577 |
| 2024/0323199 A1* | 9/2024 | Bassi | H04L 63/1425 |

OTHER PUBLICATIONS

Binsalleeh, et al., "On the analysis of the Zeus botnet crimeware toolkit", IEEE Conference, Aug. 19, 2018, pp. 1-8 (9 pages).
Bajpai, et al., "A key-management-based taxonomy for ransomware", IEEE Conference, May 17, 2018, pp. 1-12 (13 pages).

* cited by examiner

METHOD AND APPARATUS FOR DETECTING COMMAND CONTROL SERVER OF MALICIOUS APPLICATION

CROSS REFERENCE TO RELATED APPLICATION

This application claims priority to and the benefit of Korean Patent Application No. 2022-0189156, filed on Dec. 29, 2022, the disclosure of which is incorporated herein by reference in its entirety.

BACKGROUND

1. Field of the Invention

The present disclosure relates to a method, an apparatus, and system for detecting a command control server of an application, and more specifically, to a method, apparatus, and system for analyzing malicious applications, such as a voice phishing application, and detecting a command control server that communicates with the application.

2. Discussion of Related Art

Voice phishing refers to a fraudulent method that impersonates a relevant organization over the phone to steal personal information or induce money transfers. As voice phishing has become a social problem and become more known, people are gradually becoming aware of the dangers of voice phishing to some extent, but voice phishing techniques are also evolving in a sophisticated manner, and cases of damage have continued to be reported in recent years. Accordingly, people are increasingly hesitant to answer calls from unknown numbers, and the number of people refusing to answer calls from people not registered in their contact list is significantly increasing.

Recently, cybercrimes that steal personal information or induce voice phishing through an application program that can be installed on smartphones or related terminal devices in the form of an application are increasing. Voice phishing criminal groups leading voice phishing crimes impersonate legitimate financial, insurance, and portal sites to distribute malicious applications targeting Android devices, and randomly call victims and impersonate an investigative agency to induce the victims to download malicious applications. In order to block the criminal groups and prevent further distribution of malicious applications, it is necessary to detect a server (i.e., a command control server) that manipulates or controls the commands of applications. However, since voice phishing malicious apps adopt various obfuscation techniques to interfere with analysis and the number of apps being distributed is great, there is an urgent need to automate the extraction of a command control server.

SUMMARY OF THE INVENTION

The present disclosure is directed to providing a method, apparatus, and system for analyzing malicious applications, such as a voice phishing application, to detect a command control server that communicates with the application.

The technical objectives of the present disclosure are not limited to the above, and other objectives that are not described above may become apparent to those of ordinary skill in the art based on the following description and the accompanying drawings.

According to an aspect of the present disclosure, there is provided an apparatus for detecting a command control server, the apparatus including: a collection unit configured to collect a malicious application; a malicious type determination unit configured to analyze the malicious application to determine a malicious type of the malicious application; and a command control server detection unit configured to detect a command control server associated with the malicious application based on the determined malicious type.

The apparatus may further include an inspection unit configured to check whether the collected malicious application is running.

The malignant type may be one of a first type in which a first file containing encrypted information about the command control server is present in the malicious application, a second type in which an encrypted class or encrypted command calling the command control server is present in the malicious application, and a third type in which information related to communication with an external server is present in the malicious application.

When the malicious type is the first type, the command control server detection unit may be configured to: identify the encrypted information about the command control server in the first file; and decrypt the encrypted information about the command control server based on an encryption method. The encryption method may include a combination of an advanced encryption standard (AES)-128 encryption method in an electronic code book (ECB) mode and a BASE64 encoding method. The command control server detection unit may decrypt the encrypted information about the command control server based on an encryption key included in the first file and the encryption method.

When the malicious type is the second type, the command control server detection unit may be configured to identify the encrypted class or encrypted command that calls the command control server in the malicious application, decrypt the encrypted class or the encrypted command based on decryption information included in a second file associated with the encrypted class or the encrypted command, and decompile the decrypted class or the decrypted command to obtain information about the command control server. The command control server detection unit may decrypt the encrypted class or the encrypted command using a combination of an advanced encryption standard (AES)-128 encryption method in an electronic code book (ECB) mode and a BASE64 encoding method and one or more decryption keys.

When the malicious type is the third type, the command control server detection unit may be configured to identify the information related to the communication with the external server and obtain information about the command control server from the external server based on the information related to the communication with the external server. When the information about the command control server is in an encrypted state, the information about the command control server may be obtained using a combination of an advanced encryption standard (AES)-128 encryption method in a cipher block chaining (CBC) mode and a BASE64 encoding method and one or more decryption keys.

When the external server is a community server, the command control server detection unit may be configured to identify profile information of a community user identified in the information related to the communication with the external server from the external server and obtain information about the command control server using one or more strings included in the profile information of the user, According to another aspect of the present disclosure, there is provided a method of detecting a command control server, the method including: collecting a malicious application; analyzing the malicious application to determine a malicious type of the malicious application; and detecting a command control server associated with the malicious application based on the determined malicious type.

The technical solutions of the present specification are not limited to the above, and other solutions may become apparent to those of ordinary skill in the art based on the following description and the accompanying drawings.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings.

DETAILED DESCRIPTION OF EXEMPLARY EMBODIMENTS

Figure 1:
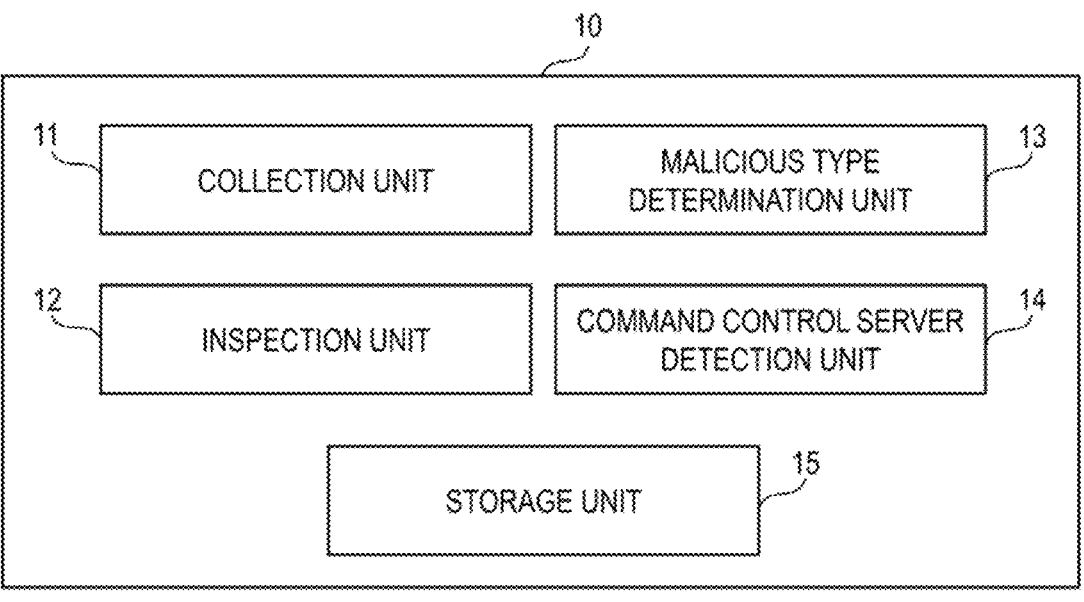
FIG. 1 is a diagram illustrating a configuration of an apparatus for detecting a command control server according to an embodiment of the present disclosure.

Hereinafter, advantages, features of the present disclosure, and ways to achieve them will become readily apparent with reference to the following detailed description of embodiments in conjunction with the accompanying drawings. The present disclosure is not limited to the embodiments disclosed below, and may be embodied in various forms. The embodiments to be described below are only embodiments provided to complete the disclosure of the present disclosure and help those skilled in the art to completely understand the scope of the present disclosure, and the present disclosure is defined only by the scope of the appended claims.

It will be understood that, although the terms "first," "second," and the like may be used herein to describe various elements, these elements should not be limited by these terms. These terms are only used to distinguish one element from another. For example, a first element could be named a second element, and similarly, a second element could be named a first element, without departing from the scope of the present disclosure. As used herein, the term "and/or" includes any and all combinations of one or more of the associated listed items.

It will be understood that when an element is referred to as being "connected" or "coupled" to another element, it may be directly connected or coupled to the other element or intervening elements may be present. On the other hand, when an element is referred to as being "directly connected" or "directly coupled" to another element, there are no intervening elements present.

Terminology used herein is for the purpose of only describing particular embodiments and is not intended to limit the invention. As used herein, the singular forms are intended to include the plural forms as well, unless the context clearly indicates otherwise. It will be further understood that the terms "comprises," "comprising," "includes" and/or "including" used herein specify the presence of stated features, integers, steps, operations, elements, and/or components, but do not preclude the presence or addition of one or more other features, integers, operations, operations, elements, components, and/or groups thereof.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in detail with reference to the accompanying drawings. In the drawings, like numerals refer to like elements.

FIG. 1 is a diagram illustrating a configuration of an apparatus for detecting a command control server according to an embodiment of the present disclosure.

In FIG. 1, an exemplary diagram illustrating an apparatus 10 for detecting a command control server according to embodiments, which performs a method of detecting a command control server, is shown. The apparatus 10 for detecting a command control server may collect malicious applications or malicious programs to obtain information about an external separate server that communicates with the malicious applications or malicious programs or controls the malicious applications or malicious programs, that is, a command control server, to detect a command control server.

The command control server described in this specification may refer to, for example, an external server that produces or distributes a malicious application, or an external server that communicates with malicious application(s) or controls the execution of malicious code to steal, monitor, or control sensitive information of a terminal device on which the malicious application is installed. In this case, the malicious application may include information about the command control server or execute a command that calls or requests the command control server.

The malicious application described in this specification may refer to an application program that is generated to obtain malicious or illegal permission from a terminal device on which the application is installed and maliciously control the terminal device, steal information, or maliciously use the information. The malicious applications may, in particular, refer to applications that perform voice phishing or mediate voice phishing, application program that contain malicious code that maliciously encrypts the terminal device such that the terminal device cannot be used by the user, and the like.

The apparatus 10 for detecting a command control server may analyze the file structure, data structure, execution form, execution command, source code, and the like of the malicious application, and based on the analysis, obtain information about the command control server or detect clues for detecting the command control server.

Referring to FIG. 1, the apparatus 10 for detecting a command control server may include one or more among at least a collection unit 11, an inspection unit 12, a malicious type determination unit 13, a command control server detection unit 14, and a storage unit 15. The apparatus 10 for detecting a command control server may collect, inspect, and analyze malicious applications through the interaction of the above-described components, and detect a command control server that controls the malicious applications or is associated with the malicious applications.

The collection unit 11 collects malicious application(s). For example, the collection unit 11 may download files of malicious applications directly from a source directly set by an administrator (e.g., a voice phishing application distribution site, a voice phishing application distribution server, and the like), and store the downloaded files of malicious applications in the storage unit 15. The collection unit 11 may collect a plurality of malicious applications in real time based on rules or conditions set by the administrator.

The inspection unit 12 checks whether the malicious application collected by the collection unit 11 is running or executable. The inspection unit 12 may check whether the malicious application is running by directly executing the malicious application. Additionally, the inspection unit 12 may check whether the malicious application may run normally based on the file structure, data structure, source code, and the like of the malicious application. For example, the inspection unit 12 may check the extension of the malicious application (e.g. APK, ABB, and the like) and check whether there are file(s) required to run the application based on the file structure defined by the extension.

The malicious type determination unit 13 may analyze files of applications collected by the collection unit 11 and/or applications confirmed by the inspection unit 12 to be runnable to determine the malicious type of the malicious application. For example, the malicious type determination unit 13 may determine at least one malicious type corresponding to an analyzed malicious application from a plurality of predefined malicious types. The malicious type determination unit 13 may determine one or more malicious types based on a predefined condition for each malicious type.

The command control server detection unit 14 analyzes malicious applications and detects a command control server. The command control server detection unit 14 may detect the command control server based on each or a combination of one or more detection mechanism(s) and/or a plurality of predefined decoding method(s) predefined by the administrator.

The command control server detection unit 14 may select one or more of the command control server detection method(s) set for each type based on the malicious type determined by the malicious type determination unit 13 according to the embodiments, and determine the command control server within the application. In other words, the command control server detection unit 14 may detect the command control server using a command control server detection method(s) individually determined for each malicious type.

Meanwhile, specific examples of malicious types and specific examples of methods of detecting a command control server for each malicious type will be described in detail in FIGS. 3 and 4.

The storage unit 15 stores information or applications collected, detected, or generated by the apparatus 10 for detecting a command control server according to embodiments. For example, the storage unit 15 may store malicious applications collected by the collection unit 11 according to embodiments, and store the malicious type of each malicious application determined by the malicious type determination unit 13 according to embodiments. The storage unit 15 may store information about a command control server of each malicious application detected by the command control server detection unit 14.

The storage unit 15 may store malicious applications and information about a command control server of each application. The apparatus 10 for detecting a command control server may use such information stored in the storage unit 15 to extract a pattern of a new malicious type or new malicious application, and generate a new malicious type based on the extracted pattern or notify an administrator of the possibility of a new malicious type, and the like.

Meanwhile, the apparatus 10 for detecting a command control server according to embodiments may analyze a malicious application by which a command control server has been detected by the above-described methods or operations to modify or improve the method of detecting a command control server for each malicious type (e.g., a server information storage method, an encryption technique, an encryption key, and the like). For example, the apparatus 10 for detecting a command control server may, with respect to a malicious application by which a command control server has been detected, derive a location in which information about the command control server is stored (a storage path and the like), a pattern in which the information is stored, an encryption pattern, a frequently used encryption key, a frequently used encryption technique, and the like. Thereafter, the apparatus 10 for detecting a command control server may determine the order of priority of the locations (a storage path, and the like) in a file to be searched for information about a command control server, the encryption patterns, the encryption keys, and the encryption techniques. For example, when it is confirmed that an advanced encryption standard (AES)-128 method in electronic code book (ECB) mode is widely used, the apparatus 10 for detecting a command control server may assign a high priority to the AES-128 method in the ECB mode and attempt to decrypt encrypted information about a command control server, encrypted classes, and the like.

With such a configuration, a system for detecting a command control server according to an embodiment of the present disclosure may easily detect a command control server configured to communicate in common with a large number of malicious applications.

With such a configuration, a system for detecting a command control server according to an embodiment of the present disclosure detects a command control server in charge of the main functions of malicious applications and helps to neutralize the command control server, thereby reducing the actual benefit of distributing a large number of malicious applications.

Figure 2:
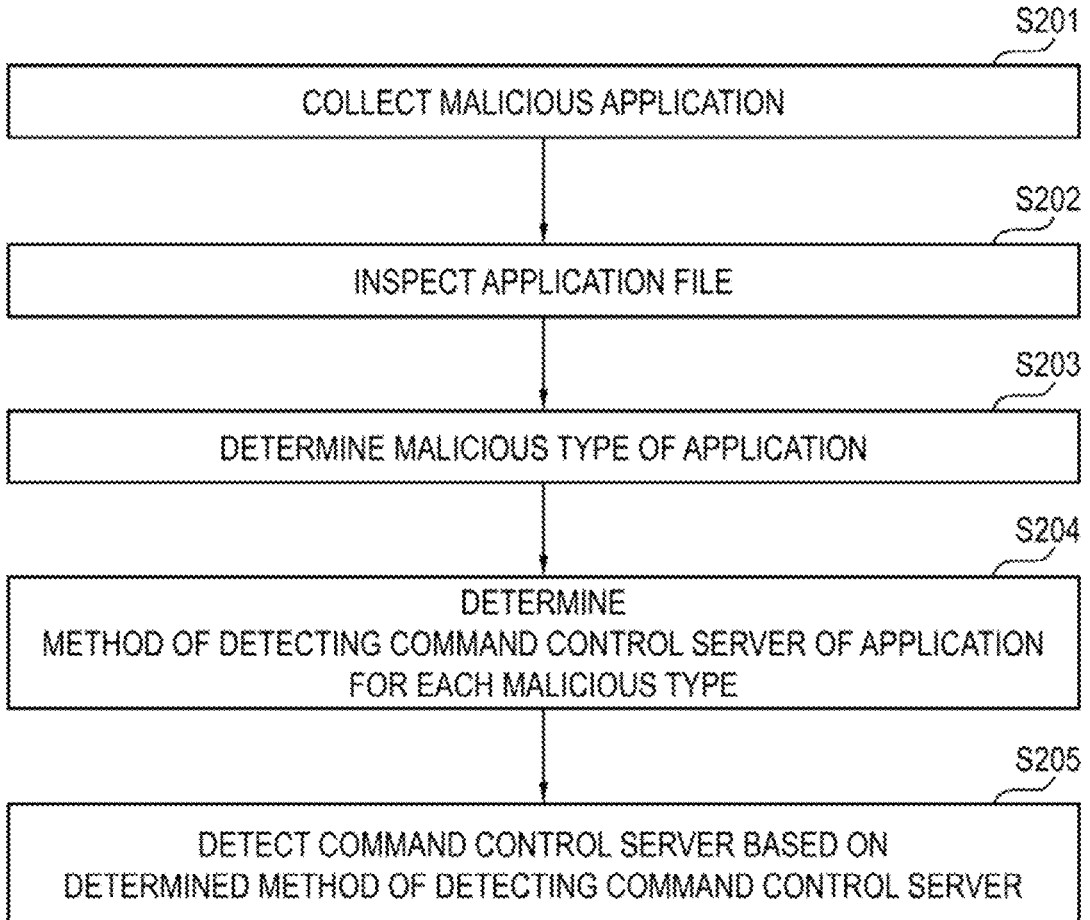
FIG. 2 is a diagram showing an example of operations of a method of detecting a command control server according to an embodiment of the present disclosure.

FIG. 2 is a diagram showing an example of operations of a method of detecting a command control server according to an embodiment of the present disclosure;

Some or all of the operations shown in FIG. 2 may be performed by the apparatus 10 for detecting a command control server according to the embodiments shown in FIG. 1.

Referring to FIG. 2, the apparatus 10 for detecting a command control server according to embodiments may first collect malicious application(s) (S201). Operation S201 may be performed, for example, by the collection unit 11 shown in FIG. 1. The apparatus 10 for detecting a command control server according to embodiments may collect only malicious applications desired to be collected based on the characteristics, file extensions, file names, and metadata of the malicious applications to be collected in operation S201.

Next, the apparatus 10 for detecting a command control server according to embodiments may inspect collected files of the collected malicious application(s) (S202). Operation S202 may be performed, for example, by the inspection unit 12 shown in FIG. 1. The apparatus 10 for detecting a command control server according to embodiments may inspect a file extension, a structure of a file, and a library in a file of the collected malicious application(s) to check whether the application is running.

The apparatus 10 for detecting a command control server according to embodiments may further check whether the application is malicious in operation S202. For example, the apparatus 10 for detecting a command control server may inspect the structure of the application file and library(s), class(es), and detailed file(s) included in the file to check whether the application is malicious. For example, when an application file includes a program or file that performs anti-decompilation, the application may be confirmed as being malicious. Also, for example, when an application file includes a hidden class or a class or information, which is not accessible in a normal way or is encrypted with non-generalized encryption techniques (e.g., a secret-classes*.dex file and the like), the application may be confirmed as malicious. Also, for example, when an application file includes a shared library or an abnormal library, the application may be confirmed as malicious.

Thereafter, the apparatus 10 for detecting a command control server according to embodiments may determine the malicious type of the malicious application(s) (S203). Operation S203 may be performed, for example, by the malicious type determination unit 13 shown in FIG. 1.

Thereafter, the apparatus 10 for detecting a command control server according to embodiments may determine a method of detecting a command control server for an application (S204). Thereafter, the apparatus 10 for detecting a command control server according to embodiments may detect a command control server based on the determined method of detecting a command control server (S205). Operation S204 and/or operation S205 may be performed, for example, by the command control server detection unit 14 shown in FIG. 1.

The malicious type may be, for example, a case in which a malicious application includes a specific file (e.g., an important file, such as libfirebase.so, a manifest file, an important configuration file, and the like), and the specific file includes information about a command control server that is encrypted and stored. In addition, the malicious type may be, for example, a case in which a malicious application includes encrypted classes in which a class directly calling a command control server is present or a class executing a command to transmit or receive information to or from a command control server is present. In addition, the malicious type may be, for example, a case in which a malicious application is designed to download an encrypted command control server from a specific external server (e.g., a community server, and the like). The command control server detection unit 14 according to embodiments may detect a command control server for a malicious application using a method of detecting a command control server, which is suitable for each malicious type.

Specific details on the above-described malicious types and specific examples of methods of detecting a command control server corresponding to the malicious types will be described in FIGS. 3 and 4.

With such a configuration, a system for detecting a command control server according to an embodiment of the present disclosure may easily detect a command control server configured to communicate in common with a large number of malicious applications.

With such a configuration, a system for detecting a command control server according to an embodiment of the present disclosure may detect a command control server in charge of the main functions of malicious applications and help to neutralize the command control server, thereby reducing the actual benefit of distributing a large number of malicious applications.

Figure 3:
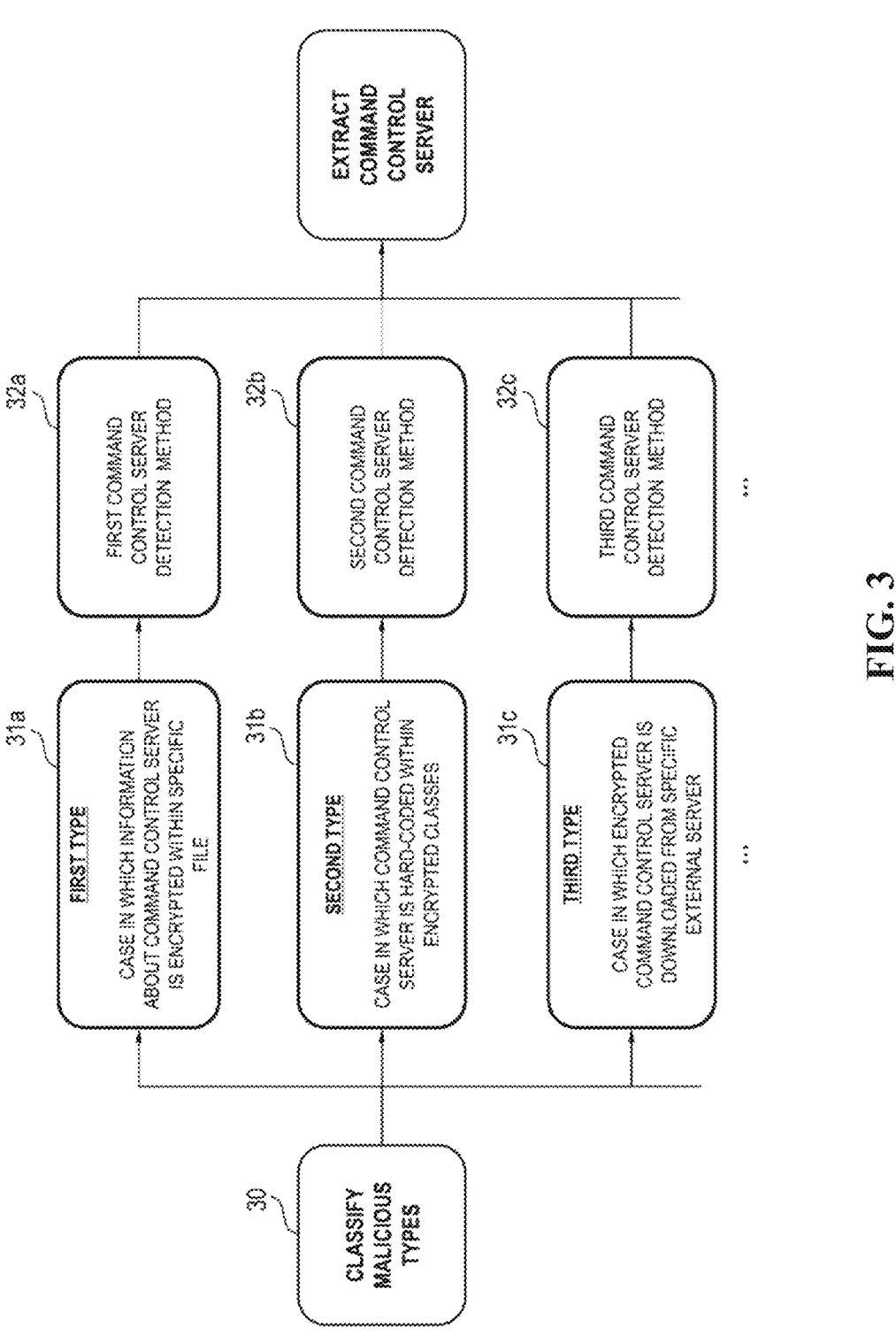
FIG. 3 is a diagram showing an example of a method of detecting a command control server of a malicious application for each malicious type by an apparatus for detecting a command control server according to an embodiment of the present disclosure.

FIG. 3 is a diagram showing an example of a method of detecting a command control server of a malicious application for each malicious type by an apparatus 10 for detecting a command control server according to an embodiment of the present disclosure.

Some or all of the operations shown in FIG. 3 may be performed by the malicious type determination unit 13 and/or the command control server detection unit 14 shown in FIG. 1, and may be performed in operations S203 to S205 shown in FIG. 2.

The apparatus 10 for detecting a command control server according to embodiments may classify the malicious type of the malicious application (30). Referring to FIG. 3, the malicious types may be, for example, a case in which information about a command control server is encrypted in a specific file (a first type 31*a*), a case in which a command control server is hard-coded in encrypted classes (i.e., encrypted classes stored in a malicious application include a class directly calling a command control server or a class executing a command to transmit/receive data to/from a command control server) (a second type 31*b*), and a case in which an encrypted command control server is downloaded from a specific external server (e.g., a community server) (a third type 31*c*).

In the case of the first type 31*a*, the specific file may refer to, for example, an important file, such as libfirebase.so, a manifest file, an important configuration file, and the like. In the case of the first type 31*a*, since information about a command control server may be encrypted in the above-described file, the apparatus 10 for detecting a command control server may perform decryption on the encrypted information of the command control server using a combination of one or more encryption techniques and one or more encryption keys.

Meanwhile, the encryption technique may include, for example, an AES-128 encryption method in the ECB mode. Additionally, the encryption key may be, for example, a string encoded in BASE64. Here, the encryption key may be included in, for example, at least one of the specific file(s) described above. Therefore, the apparatus 10 for detecting a command control server may identify a string encoded using the BASE64 technique or another technique in the specific file(s) described above and decode the string using the BASE64 technique or the other technique to derive the encryption key.

In the case of the first type 31*a*, the apparatus 10 for detecting a command control server according to embodiments performs a command control server detection method suitable for the first type 31*a* based on the method described above (32*a*). For example, the apparatus 10 for detecting a command control server may extract and/or select an encryption key and encryption method based on the method described above, and decrypt the information about the command control server using the selected encryption key and encryption method to extract the information about the command control server.

In the case of the second type 31b, a malicious application may include a plurality of encrypted classes. In this case, the apparatus 10 for detecting a command control server may perform a command control server detection method suitable for the second type to detect a command control server (32b). For example, the apparatus 10 for detecting a command control server may search for and detect a decryption key in the malicious application to decrypt the encrypted classes. The apparatus 10 for detecting a command control server may, for example, identify the decryption key in one or more files (e.g., a libdn_ssl.so file, and the like) storing decryption keys.

When the decryption key is found in the above-described file, the apparatus 10 for detecting a command control server may decrypt the encrypted class(es) based on the decryption key that is found. Meanwhile, the class may be encrypted, for example, based on the AES-128 encryption method in the ECB mode. Additionally, the decryption key may be present, for example, in the form of a BASE64 encoded string in the files storing decryption keys described above. Therefore, the apparatus 10 for detecting a command control server may identify a string encoded using the BASE64 technique or another technique in the specific file(s) described above and decode the string with the BASE 64 technique or the other technique to derive the above described decryption key.

The apparatus 10 for detecting a command control server may decompile the decrypted class based on the above-described method. The apparatus 10 for detecting a command control server may identify the decompiled result and extract information about the command control server included in the decompiled result.

In the case of the third type 31c, the malicious application may download information about an encrypted command control server or data for connecting to a command control server from an external server (e.g., a community server and the like). The malicious application may include commands to download the data from the external server. The external server may refer to, for example, a specific community server (e.g., Reddit and the like), a voice phishing application distribution site, a voice phishing program distribution server, and the like.

In this case, the apparatus 10 for detecting a command control server may perform a command control server detection method suitable for the third type 31c to detect a command control server (32c). For example, the apparatus 10 for detecting a command control server may find address information (or path information) for downloading information about a command control server in the malicious application. For example, the apparatus 10 for detecting a command control server may identify a file containing address information for downloading a command control server (e.g., a secret-classes.dex file and the like), to identify and check information about an external server for downloading a command control server.

Meanwhile, the above-described address information (or path information) or information about the command control server may be encrypted. In this case, the apparatus 10 for detecting a command control server may decrypt the above-described address information (or path information) or information about the command control server based on one or more encryption techniques and/or one or more decryption keys. For example, the encryption technique may include an AES-128 encryption technique in a cipher block chaining (CBC) mode. Additionally, the encryption key may be, for example, a string encoded in BASE64. Here, the encryption key may be included in, for example, at least one of the specific file(s) of the malicious application, or may be included in the external server. For example, when the external server from which a command control server is downloaded is a specific community server (e.g. a Reddit server), the encryption key may be a string (e.g., a string contained in a specific field) included in specific user information (profile information) within the community server.

The apparatus 10 for detecting a command control server may identify the above-described encryption key or encoded string using the BASE64 technique or another technique, and decode the corresponding string using the BASE64 technique or the other technique to derive the encryption key.

Meanwhile, the apparatus 10 for detecting a command control server according to embodiments may analyze a malicious application by which a command control server has been detected by the above-described methods or operations to modify or improve the method of detecting a command control server for each malicious type (e.g., a server information storage method, an encryption technique, an encryption key, and the like). For example, the apparatus 10 for detecting a command control server may, with respect to a malicious application by which a command control server has been detected, derive a location in which information about the command control server is stored (a storage path and the like), a pattern in which the information is stored, an encryption pattern, a frequently used encryption key, a frequently used encryption technique, and the like. Thereafter, the apparatus 10 for detecting a command control server may determine the order of priority of the locations (a storage path, and the like) in a file to be searched for information about a command control server, the encryption patterns, the encryption keys, and the encryption techniques. For example, when it is confirmed that an AES-128 method in the ECB mode is widely used, the apparatus 10 for detecting a command control server may assign a high priority to the AES-128 method in the ECB mode and attempt to decrypt encrypted information about a command control server, encrypted classes and the like.

With such a configuration, a system for detecting a command control server according to an embodiment of the present disclosure may easily detect a command control server configured to communicate in common with a large number of malicious applications.

With such a configuration, a system for detecting a command control server according to an embodiment of the present disclosure may detect a command control server in charge of the main functions of malicious applications and help to neutralize the command control server, thereby reducing the actual benefit of distributing a large number of malicious applications.

With such a configuration, a system for detecting a command control server according to an embodiment of the present disclosure may automatically detect a command control server of malicious applications, thereby reducing the number of malicious applications distributed on the network.

With such a configuration, a system for detecting a command control server according to an embodiment of the present disclosure may utilize comprehensively collected data, thereby supporting rapid investigations such as on major distribution sites and major command control servers.

Figure 4:
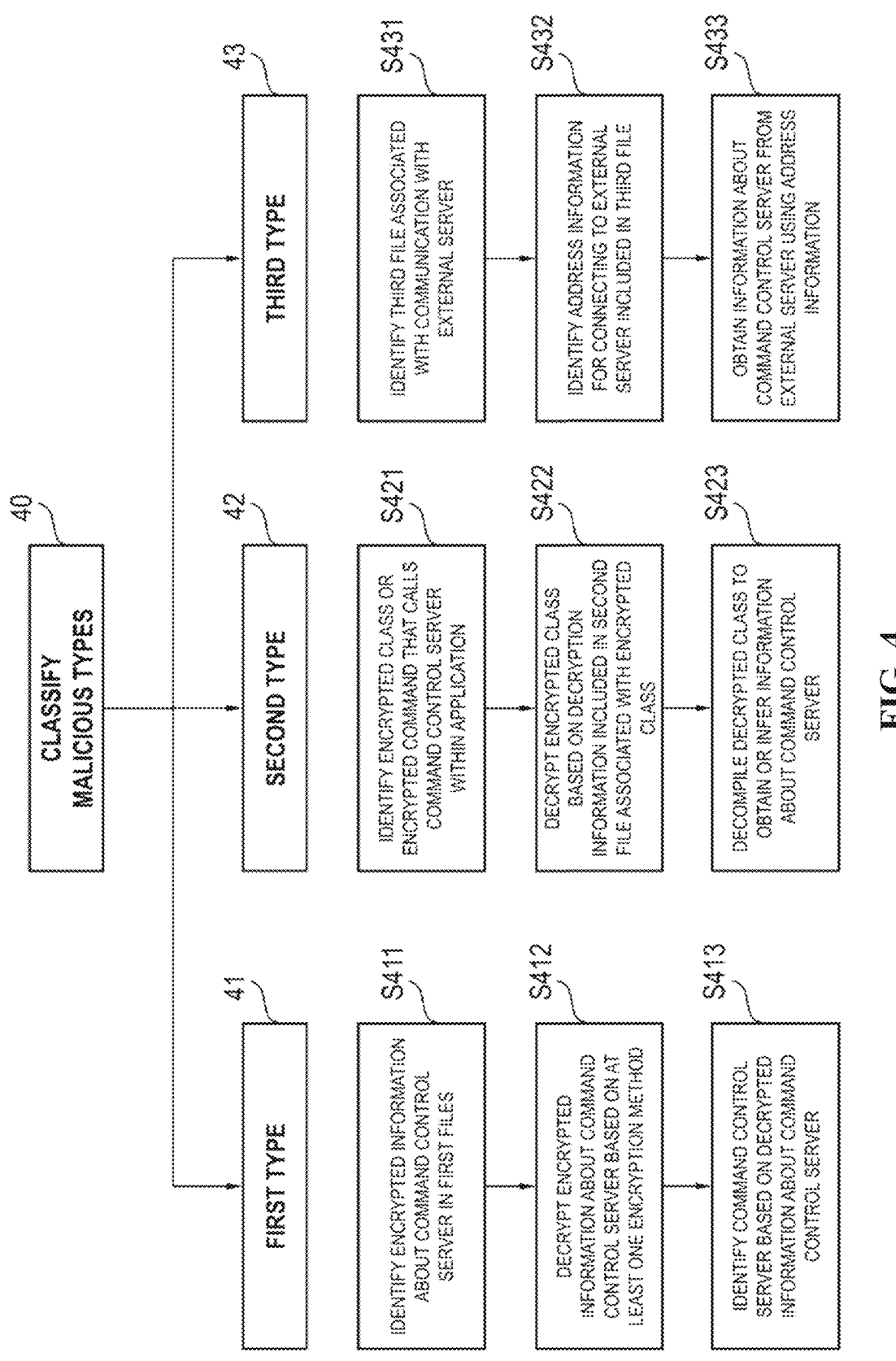
FIG. 4 is a diagram showing a specific example of operations of detecting a command control server of a malicious application for each malicious type by an apparatus for detecting a command control server according to an embodiment of the present disclosure.

FIG. 4 is a diagram showing a specific example of operations of detecting a command control server of a malicious application for each malicious type by an apparatus for detecting a command control server according to an embodiment of the present disclosure.

In FIG. 4, examples of command control server detection methods 32a to 32c performed by the apparatus 10 for detecting a command control server for each malicious type 31a to 31c described in FIG. 3 are shown. For example, in the case of the malicious type of the malicious application corresponding to the first type 31a in FIG. 3, the apparatus 10 for detecting a command control server may perform operations S411 to S413. For example, in the case of the malicious type of the malicious application corresponding to the second type 31b in FIG. 3, the apparatus 10 for detecting a command control server may perform operations S421 to S423. For example, in the case of the malicious type of the malicious application corresponding to the third type 31c in FIG. 3, the apparatus 10 for detecting a command control server may perform operations S431 to S433.

Referring to FIG. 4, in the case of the first type 41, that is, when information about a command control server is encrypted in a specific file, the apparatus 10 for detecting a command control server may first 1) identify the encrypted information about the command control server in first files (S411), 2) decrypt the encrypted information about the command control server based on at least one encryption method (S412), and 3) identify the command control server based on the decrypted information about the command control server (S413).

Referring to FIG. 4, in the case of the second type 42, that is, when a command control server is hard-coded in encrypted classes (i.e., encrypted classes stored in a malicious application include a class directly calling a command control server or a class executing commands to transmit/receive data to/from a command control server), the apparatus 10 for detecting a command control server may first 1) identify an encrypted class or encrypted command that calls a command control server in the malicious application (S421), 2) decrypt the encrypted class based on decryption information included in a second file associated with the encrypted class (S422), and 3) decompile the decrypted class to obtain or infer information about the command control server (S423).

Referring to FIG. 4, in the case of the third type 43, that is, when an encrypted command control server is downloaded from a specific external server (e.g., a community server), the apparatus 10 for detecting a command control server may 1) identify a third file associated with communication with the external server, 2) identify address information for accessing the external server included in the third file (S432), and 3) obtain information about the command control server from the external server using the address information (S433).

Figure 5:
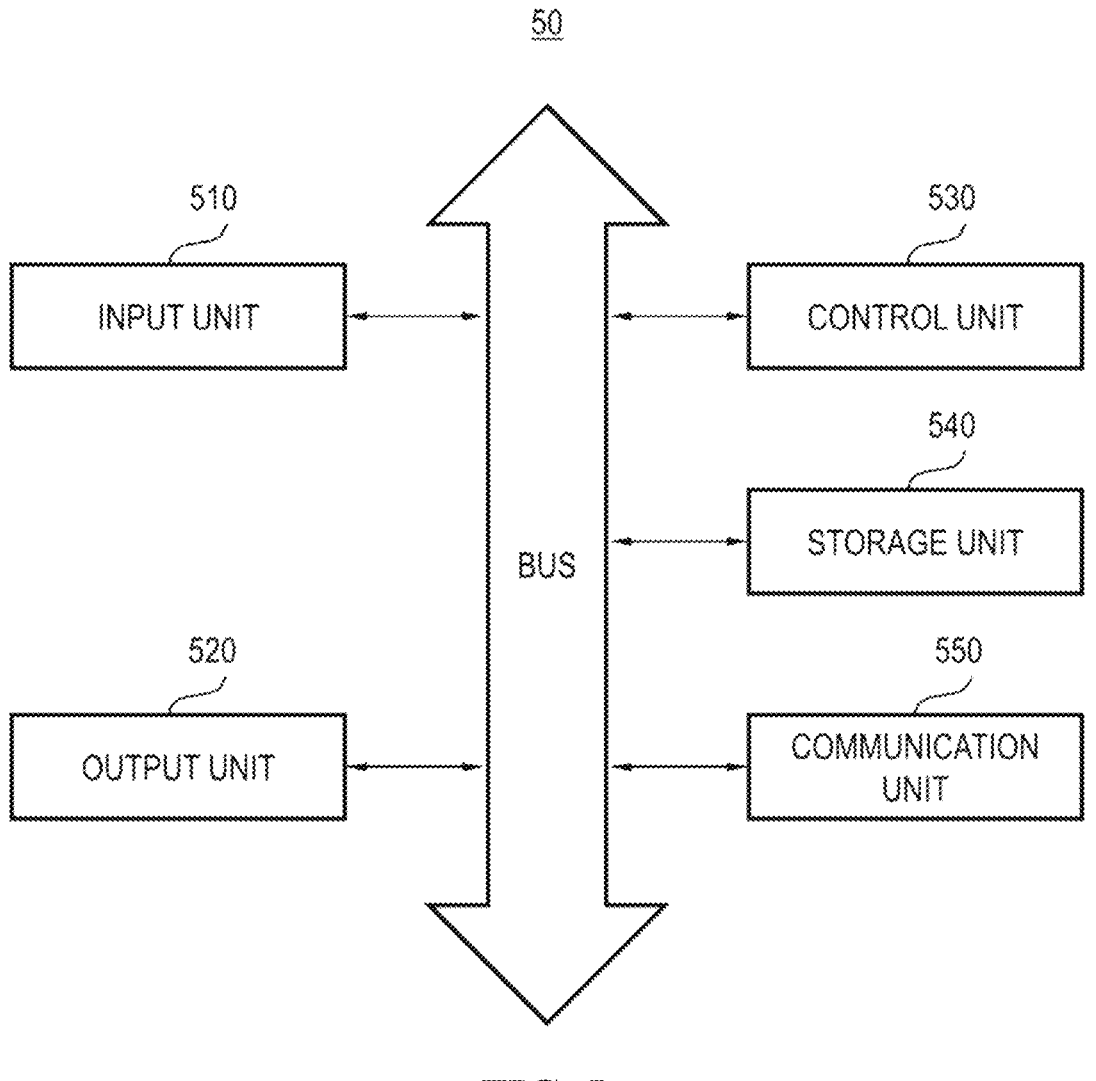
FIG. 5 is a diagram illustrating a configuration of a server according to an embodiment of the present disclosure.

FIG. 5 is a diagram illustrating a configuration of a server according to an embodiment of the present disclosure.

Referring to FIG. 5, a server 50 includes an input unit 510, an output unit 520, a control unit 530, a storage unit 540, and a communication unit 550.

The input unit 510 receives commands or information from the administrator. The input unit 510 may include one or more among a microphone for receiving an audio signal and the key input unit. The key input unit may include a touch key and/or a mechanical key.

The input unit 510 may receive settings or input signals related to the above described operations of the apparatus 10 for detecting a command control server from the administrator of the apparatus 10 for detecting a command control server described above.

The output unit 520 outputs command processing results or various types of information to the administrator. For example, the output unit 520 outputs information generated by the method, apparatus, or system for detecting a command control server described above. To this end, although not shown in FIG. 5, the output unit 520 may include a display, a speaker, a haptic output unit, and an optical output unit. The display may be provided as a flat panel display, a flexible display, an opaque display, a transparent display, electronic paper (E-paper), or any form of displays well known in the art to which the present disclosure pertains. A touch pad may be stacked on the display to form a touch screen, and through the touch screen, touch keys may be implemented. In addition to the display and speaker, the output unit 520 may further include any type of output devices well known in the art to which the present disclosure pertains.

The control unit 530 connects and controls components within the server 50. As an example, the control unit 530 controls each component such that information generated from the method, apparatus, or system for detecting a command control server described above is output through the output unit 520. As another example, when determination information is input by an administrator, the control unit 530 generates a response signal including the determination information. The control unit 330 includes a central processing unit (CPU), a micro-processor unit (MPU), a micro controller unit (MCU), a graphics processing unit (GPU), or any type of processors well known in the art of the present disclosure.

The storage unit 540 stores data, programs, and applications required for the server 50 to operate. The storage unit 540 may include non-volatile memories, volatile memories, hard disks, optical disks, magneto-optical disks, or any type of computer-readable recording media well known in the art to which the present disclosure pertains.

The communication unit 550 communicate with the apparatus 10 for detecting a command control server according to embodiments and other objects (e.g., an external server, an external terminal device, and the like) through a wired or wireless network. For example, the communication unit 550 collects and receives malicious applications from an external server that distributes or generates malicious applications. To this end, the communication unit 550 supports a wired communication method and/or a wireless communication method.

With such a configuration, a system for detecting a command control server according to an embodiment of the present disclosure can easily detect a command control server configured to communicate in common with a large number of malicious applications.

With such a configuration, a system for detecting a command control server according to an embodiment of the present disclosure can detect a command control server in charge of the main functions of malicious applications and help to neutralize the command control server, thereby reducing the actual benefit of distributing a large number of malicious applications.

With such a configuration, a system for detecting a command control server according to an embodiment of the present disclosure can automatically detect a command control server of malicious applications, thereby reducing the number of malicious applications distributed on the network.

With such a configuration, a system for detecting a command control server according to an embodiment of the present disclosure can utilize comprehensively collected data, thereby supporting rapid investigations such as on major distribution sites and major command control servers.

The effects of the present disclosure are not limited to the effects described above, and other effects that are not described will be clearly understood by those skilled in the art from the above description.

While the disclosure has been shown and described with respect to particulars, such as specific components, embodiments, and drawings, the embodiments are used to aid in the understanding of the present disclosure rather than limiting the present disclosure, and those skilled in the art should appreciate that various changes and modifications are possible without departing from the spirit and scope of the invention.

What is claimed is:

1. An apparatus for detecting a command control server, the apparatus comprising:
a processor; and
a memory storing instructions executable by the processor,
wherein the processor is configured to execute the instructions to:
collect a malicious application,
analyze the malicious application to determine a malicious type of the malicious application, and
detect the command control server associated with the malicious application based on the determined malicious type,
wherein the malicious type is one of:
a first type in which a first file containing encrypted information about the command control server is present in the malicious application,
a second type in which an encrypted class or encrypted command calling the command control server is present in the malicious application, and
a third type in which information related to communication with an external server is present in the malicious application,
wherein based on the malicious type being the third type and the external server being a community server, the processor is further configured to execute the instructions to:
identify profile information of a community user identified in the information related to the communication with the external server,
obtain the encrypted information about the command control server using a string included in the profile information of the user, and
decrypt the encrypted information about the command control server by using an decryption key corresponding to the encrypted information.

2. The apparatus of claim 1, wherein the processor is further configured to execute the instructions to check whether the collected malicious application is running.

3. The apparatus of claim 1, wherein, when the malicious type is the first type, the processor is further configured to execute the instructions to:
identify the encrypted information about the command control server in the first file; and
decrypt the encrypted information about the command control server based on an encryption method.

4. The apparatus of claim 3, wherein the encryption method includes a combination of an advanced encryption standard (AES)-128 encryption method in an electronic code book (ECB) mode and a BASE64 encoding method.

5. The apparatus of claim 4, wherein the processor is further configured to execute the instructions to decrypt the encrypted information about the command control server based on an encryption key included in the first file and the encryption method.

6. The apparatus of claim 1, wherein, when the malicious type is the second type, the processor is further configured to execute the instructions to:
identify the encrypted class or the encrypted command that calls the command control server in the malicious application;
decrypt the encrypted class or the encrypted command based on decryption information included in a second file associated with the encrypted class or the encrypted command; and
decompile the decrypted class or the decrypted command to obtain information about the command control server.

7. The apparatus of claim 6, wherein the processor is further configured to execute the instructions to decrypt the encrypted class or the encrypted command using a combination of an advanced encryption standard (AES)-128 encryption method in an electronic code book (ECB) mode and a BASE64 encoding method and one or more decryption keys.

8. The apparatus of claim 1, wherein the encrypted information about the command control server is obtained using a combination of an advanced encryption standard (AES)-128 encryption method in a cipher block chaining (CBC) mode and a BASE64 encoding method and one or more decryption keys.

9. A method of detecting a command control server, the method comprising:
collecting a malicious application;
analyzing the malicious application to determine a malicious type of the malicious application; and
detecting the command control server associated with the malicious application based on the determined malicious type,
wherein the malicious type is one of:
a first type in which a first file containing encrypted information about the command control server is present in the malicious application,
a second type in which an encrypted class or encrypted command calling the command control server is present in the malicious application, and
a third type in which information related to communication with an external server is present in the malicious application, and
wherein based on the malicious type being the third type and the external server being a community server, the detecting of the command control server comprises:
identifying profile information of a community user identified in the information related to the communication with the external server,
obtaining the encrypted information about the command control server using a string included in the profile information of the user, and
decrypting the encrypted information about the command control server by using a decryption key corresponding to the encrypted information.

* * * * *